(12) United States Patent
Sunaga

(10) Patent No.: US 7,392,030 B2
(45) Date of Patent: Jun. 24, 2008

(54) CELL PHONE ANTENNA SWITCHING CIRCUIT AND ANTENNA SWITCHING METHOD

(75) Inventor: Teruhide Sunaga, Saitama (JP)

(73) Assignee: NEC Corporation, Tokyo (JP)

( * ) Notice: Subject to any disclaimer, the term of this patent is extended or adjusted under 35 U.S.C. 154(b) by 547 days.

(21) Appl. No.: 10/738,044

(22) Filed: Dec. 18, 2003

(65) Prior Publication Data

US 2004/0132515 A1   Jul. 8, 2004

(30) Foreign Application Priority Data

Dec. 20, 2002   (JP)   ............................. 2002-369782

(51) Int. Cl.
*H04B 1/06* (2006.01)

(52) U.S. Cl. .................. 455/277.1; 455/550.1

(58) Field of Classification Search ............ 455/575.1, 455/90, 513, 317, 436, 83, 88, 550.1, 442, 455/552.1, 432, 553.1, 404, 562.1, 439, 433, 455/414.2, 440, 33.3, 66.1, 277.1; 343/725
See application file for complete search history.

(56) References Cited

U.S. PATENT DOCUMENTS

| | | | | |
|---|---|---|---|---|
| 5,918,164 A | * | 6/1999 | Takahashi et al. ............ | 455/134 |
| 6,006,117 A | * | 12/1999 | Hageltorn et al. ......... | 455/575.7 |
| 6,118,773 A | * | 9/2000 | Todd ........................... | 370/334 |
| 6,154,177 A | | 11/2000 | Saito et al. | |
| 6,415,141 B1 | * | 7/2002 | Kakura et al. ............ | 455/277.1 |
| 6,483,884 B1 | | 11/2002 | Shen et al. | |
| 6,681,125 B1 | * | 1/2004 | Woo ........................ | 455/556.1 |
| 6,731,920 B1 | * | 5/2004 | Iwai et al. ................... | 455/272 |
| 6,901,245 B1 | * | 5/2005 | Boyle ........................ | 455/90.3 |
| 2002/0119808 A1 | * | 8/2002 | Seiki ........................... | 455/575 |
| 2003/0104796 A1 | | 6/2003 | Yoon | |
| 2003/0125078 A1 | | 7/2003 | Hong | |

FOREIGN PATENT DOCUMENTS

| | | |
|---|---|---|
| EP | 0 889 603 A2 | 1/1999 |
| JP | 11-177485 A | 7/1999 |
| JP | 2002-223185 A | 8/2002 |
| JP | 2002-261665 A | 9/2002 |
| JP | 2003-163956 A | 6/2003 |

* cited by examiner

*Primary Examiner*—Edward F. Urban
*Assistant Examiner*—Tu X. Nguyen
(74) *Attorney, Agent, or Firm*—Sughrue Mion, PLLC

(57) ABSTRACT

A cell phone antenna switching circuit includes a plurality of built-in antennas which perform radio transmission/reception. This circuit includes reception level measuring sections and an antenna switching section. The reception level measuring sections measure the reception levels of the corresponding built-in antennas. The antenna switching section always automatically selects an antenna whose reception level is high during a standby period, and selects an antenna with good antenna characteristics depending on a function during speech communication. A cell phone antenna switching method is also disclosed.

3 Claims, 3 Drawing Sheets

CELL PHONE ANTENNA SWITCHING CIRCUIT AND ANTENNA SWITCHING METHOD

BACKGROUND OF THE INVENTION

The present invention relates to a cell phone antenna switching circuit and antenna switching method and, more particularly, to a cell phone antenna switching circuit and switching method which use two built-in antennas in a cell phone which requires continuous transmission/reception as in the CDMA (Code Division Multiple Access) scheme or the like and selectively use the antennas depending on the function of the cell phone which is to be used.

In general, with increasing reductions in the size and thickness of a cell phone, it has excellent portability. The cell phone is placed near the user during speech communication, and hence the influence of the human body on an antenna is a factor that causes a deterioration in reception characteristics and the like.

Of the recent cell phones, cell phones capable of continuous transmission/reception as in the CDMA (Code Division Multiple Access) scheme or the like which realizes good communication quality have been widely used.

Cell phones using the 2-GHz band and frequencies higher than the 2-GHz band, such as cell phones based on the CDMA scheme, allow reductions in antenna length because of short wavelengths they use. For this reason, compact built-in antennas are often applied to such cell phones.

When a built-in antenna is applied to a cell phone, the antenna is mounted in a place where the human body has the smallest influence. In general, since the antenna is greatly influenced by the head of the human body during speech communication, the antenna is often mounted in a place free from the influence of the head during speech communication.

There is a recent trend toward a remarkable increase in the number of users of cell phones who connect to the Internet when executing the mail function using packet communication. That is, some users mainly perform key operation for mail communication with their hands independently of the influences of their heads. Conventional cell phones have been mainly so designed as to avoid the influences of the head of the human body. From now on, cell phones need to be designed in consideration of antenna characteristics (radiation efficiency) when they are mainly used with key operation. In order to realize this, two antennas and a conventional diversity function are used. In this case, the reception electric field levels of the two antennas which have received radio waves are measured, and one of them which has a higher reception electric field level is selected.

In a cell phone designed to perform continuous transmission/reception as in the CDMA scheme or the like, once a selected antenna is determined, the antenna in the use cannot be switched to another one by antenna diversity during continuous transmission/reception in speech communication or packet communication. If an antenna is placed at a portion where the movement of the hand exerts influences, an unfavorable antenna may be erroneously selected during key operation due to unstable reception electric field levels during the key operation. For this reason, demands have arisen for a cell phone having a built-in antenna switching function of automatically selecting an optimal antenna depending on the function.

A conventional cell phone antenna switching circuit is a portable radio apparatus which has two or more antennas capable of transmission/reception and selects a transmission antenna by comparing the reception electric field strengths of the antennas in the diversity reception mode (see, for example, Japanese Patent Laid-Open No. 2002-261665 (pp. 2-4; FIG. 2)).

Some cell phone is designed to obtain good reception characteristics even during speech communication by manually switching built-in antennas even if the cell phone is unfolded into upper and lower housings during speech communication, and the reception characteristics deteriorate when the ear of the user is brought into contact with the speaker in the upper housing and a built-in antenna is located close to the ear (see, for example, Japanese Patent Laid-Open No. 11-177485 (pp. 2-3; FIG. 2)).

In a cell phone designed to perform continuous transmission/reception as in the CDMA scheme or the like, the conventional cell phone antenna switching circuit described above cannot switch an antenna in use to the other antenna by antenna diversity during continuous transmission/reception in speech communication or packet communication after the selected antenna is determined.

In addition, since the cell phone comes into contact with part of the human body during speech communication, the antenna characteristics deteriorate.

If an antenna is placed in a portion where the movement of the hand exerts influences, in particular, since the reception electric field levels become unstable during key operation, an unfavorable antenna may be erroneously selected during the key operation.

SUMMARY OF THE INVENTION

It is an object of the present invention to provide a cell phone antenna switching circuit and antenna switching method which obtain good reception characteristics by automatically switching built-in antennas even when a built-in antenna in a cell phone comes close to the human body during speech communication, and select an optimal antenna during continuous transmission/reception in speech communication or packet communication after an antenna is selected in a cell phone designed to perform continuous transmission/reception as in the CDMA scheme or the like.

In order to achieve the above object, according to the present invention, there is provided a cell phone antenna switching circuit including a plurality of built-in antennas which perform radio transmission/reception, comprising a plurality of reception level measuring means for measuring reception levels of the corresponding built-in antennas, and antenna selection means for always automatically selecting an antenna whose reception level is high during a standby period, and selecting an antenna with good antenna characteristics depending on a function during speech communication.

DESCRIPTION OF THE PREFERRED EMBODIMENT

An embodiment of the present invention will be described next with reference to the accompanying drawings.

Figure 1:
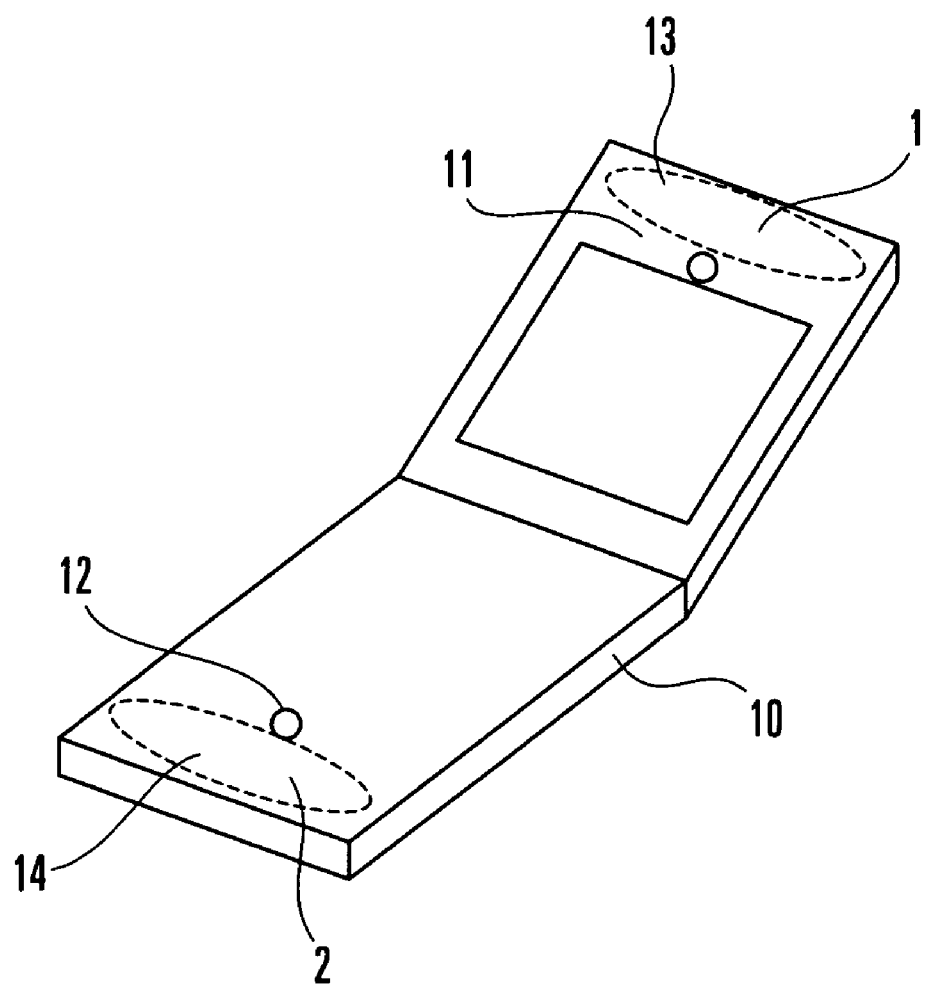
FIG. 1 is a perspective view showing the outer appearance of a cell phone antenna switching circuit according to an embodiment.

FIG. 1 shows a cell phone antenna switching circuit according to an embodiment of the present invention.

This embodiment shown in FIG. 1 is comprised of a speaker 11 and microphone 12 incorporated in a cell phone 10, an antenna 1 mounted in an area 13, and an antenna 2 mounted in an area 14.

FIG. 1 shows the positions of the two built-in antennas of the cell phone of the present invention. In this case, the shape and material of each antenna are irrelevant to the present invention. The speaker 11 and microphone 12 of the cell phone are described to mark the places where the two built-in antennas are mounted. However, the functions of these components are irrelevant to the present invention but they serve as only marks in explaining the positions of the antennas. In this case, the two built-in antennas will be referred to as the antenna 1, which is located on the speaker 11 side in the area 13 of the cell phone 10, and the antenna 2, which is located on the microphone 12 side in the area 14, respectively.

The antenna 1 is located on the speaker 11 side and mainly used when key operation is performed. The antenna 2 is located on the microphone 12 side and mainly used when the user performs speech communication while his/her ear is in contact with the speaker.

Although the antenna 1 is located on the speaker 11, there is no special reason why it is located near the speaker 11. The antenna 1 can be placed in any place as long as it exerts no influence on antenna radiation efficiency during key operation.

Likewise, although the antenna 2 is located on the microphone 12 side, the antenna can be placed in any place free from the influences of the human body in speech communication.

Figure 2:
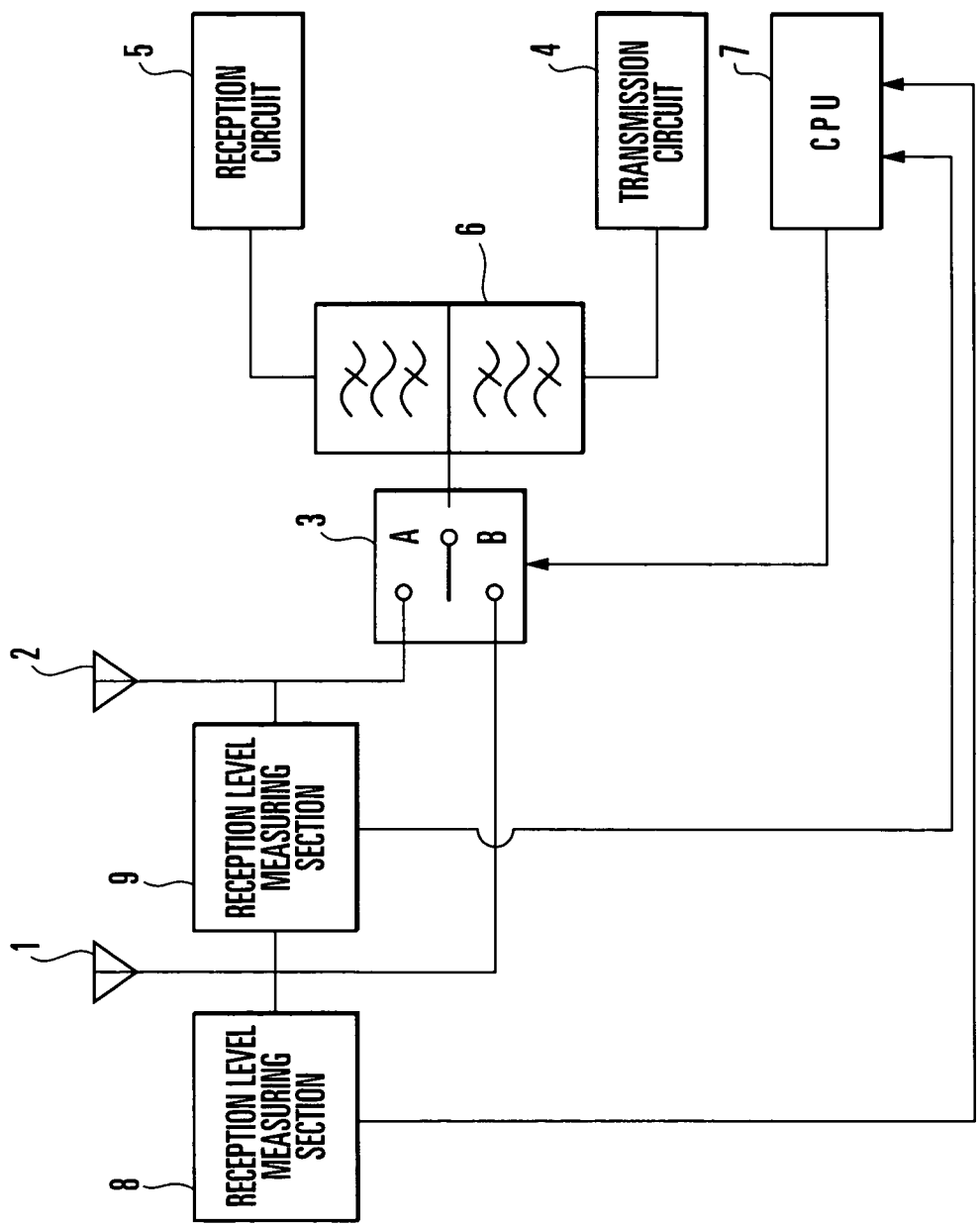
FIG. 2 is a block diagram showing the cell phone antenna switching circuit in FIG. 1.

FIG. 2 shows an antenna switching circuit for the cell phone in FIG. 1.

Note that the same reference numerals and symbols as in FIG. 1 denote the same constituent elements in FIG. 2, and a description thereof will be omitted.

Referring to FIG. 2, this circuit is comprised of the antennas 1 and 2 which are used for radio transmission/reception, an antenna switch 3 which switches the antennas 1 and 2, a transmission circuit 4 which modulates speech and packet data and transmits the modulated data, a reception circuit 5 which receives and demodulates the modulated waves of speech and packet data, a duplexer 6 which passes the transmission wave output from the transmission circuit 4 to the antenna 2 side (passes only waves in the transmission band) and passes the reception wave received by the antenna 1 to the reception circuit 5 side (passes only waves in the reception band) but does not pass transmission waves from the transmission circuit 4 side to the reception circuit 5 side, i.e., prevents interference, a CPU (Central Processing Unit) 7 which controls the antenna switch 3 functioning as a control means, a reception level measuring section 8 which measures the reception level of the antenna 1, and a reception level measuring section 9 which measures the reception level of the antenna 2.

Figure 3:
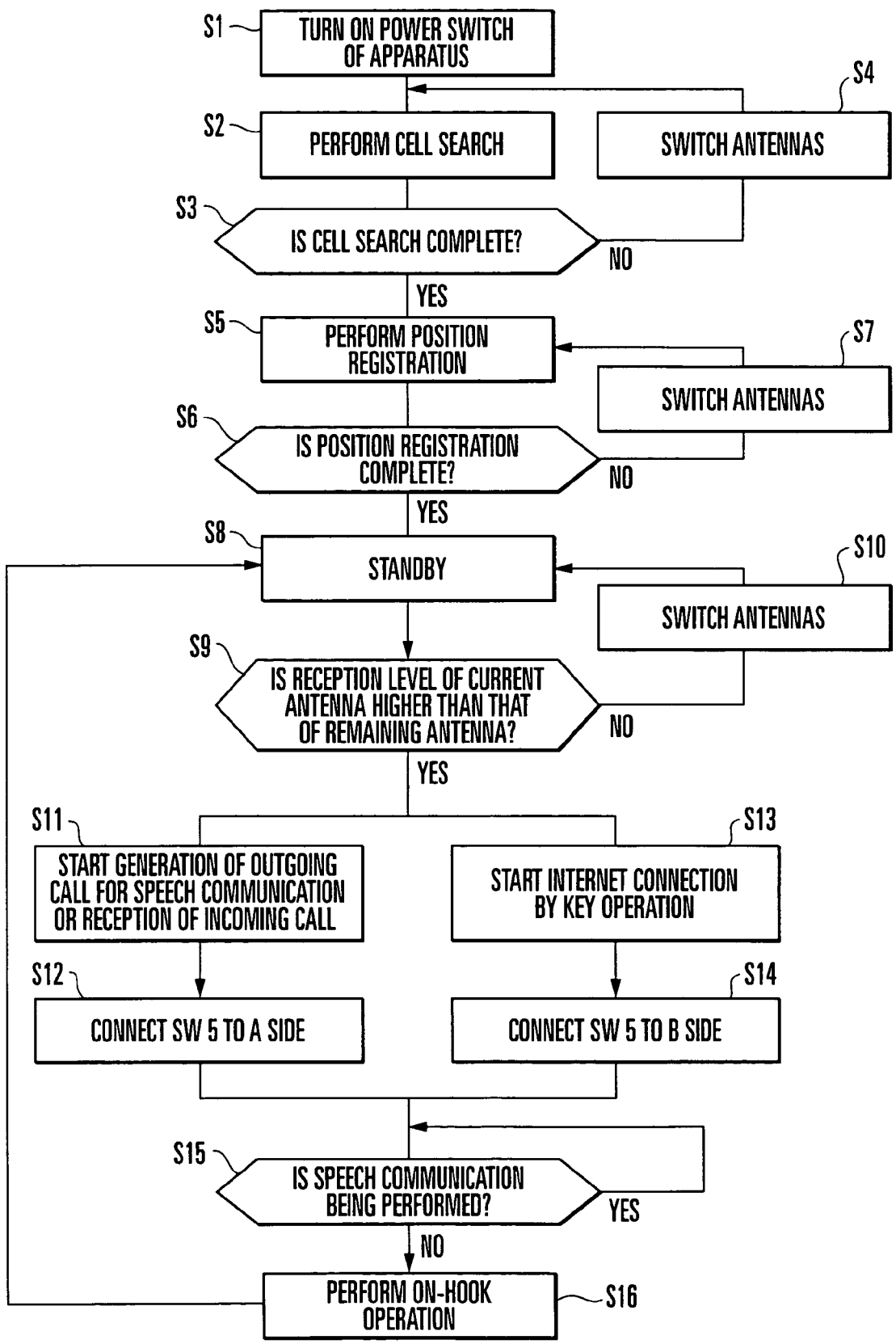
FIG. 3 is a flow chart for explaining the operation of the cell phone antenna switching circuit according to the present invention.

The operation of this embodiment will be described in detail next with reference to FIGS. 2 and 3. FIG. 3 explains the operation of the antenna switching circuit of the cell phone according to the present invention. Note that FIG. 3 shows the operation of the embodiment based on the CDMA scheme as an example.

When the power switch of the apparatus is turned on (step S1), a cell search is executed (step S2). At this time, the antenna stored when the power switch was turned off is temporarily selected. It is checked in the next step whether the cell search is complete, i.e., the cell search has succeeded (step S3). If the cell search is not complete and has failed, the antenna is switched to the other antenna, and the flow returns to step S2 (step S4) to execute a cell search again.

After the cell search is complete, the flow shifts to a position registration sequence for a base station to register the position of the cell phone (step S5). It is checked in the next step whether or not the position registration has succeeded (step S6). In this case as well, if the position registration has failed, the antenna is switched to the other antenna, and the flow returns to step S5 (step S7) to execute position registration again.

If it is determined in step S6 that the position registration has succeeded, the position registration is complete, and the flow shifts to a standby state to wait for an outgoing or incoming call for speech communication (step S8). In this standby state, one of the antennas which has a higher reception level is always selected. In this case, the reception levels of the respective antennas are measured by the reception level measuring sections 8 and 9 to determine whether the reception level of the current antenna is higher than that of the other antenna (step S9). If the reception level of the current antenna is not higher than that of the other antenna, the current antenna is switched to the other antenna, and the flow returns to the standby state in step S8 (step S10). In steps 8 and 9, one of the antennas which has a higher reception level is always selected, and the flow advances to the next step.

The next step is speech communication. When the flow advances to this step, one of the antennas which has a higher reception level is finally determined as the current antenna.

When an outgoing call for speech communication is to be generated or an incoming call is to be received in the standby state (step S11), the antenna 2 is selected by the antenna switch 3 to improve the radiation efficiency affected by the human body (ear and the like) in speech communication (except for speech communication through an earphone/microphone). That is, the CPU 7 instructs the antenna switch 3 to connect the switch to the A side so as to select the antenna 2 (step S12). If the antenna 1 is selected during speech communication, since the antenna is located near the head of the human body, the antenna radiation efficiency deteriorates. If the antenna 2 is selected, since the microphone is separated from the mouth of the human body to a certain degree, the radiation efficiency can be improved as compared with the antenna 1.

When Internet connection (packet communication) is started by key operation in the standby state (step S13), since the user mainly performs key pressing operation during packet communication, one of the antennas which is less influenced by the hand must be selected. If the antenna 2 is used in this case, the reception level becomes unstable because the antenna 2 is covered with the hand. Using the antenna 1 will therefore improve the antenna radiation efficiency. For this reason, when packet transmission is to be performed, the CPU 7 instructs the antenna switch 3 to connect the antenna switch 3 to the B side so as to select the antenna 1 (step S14).

In either case, the flow advances to the next step to always check whether speech communication is being performed (step S15). If no speech communication is being performed, on-hook operation is performed, and the flow returns to the standby state in step S8 again (step S16).

As described above, when a cell phone which requires continuous transmission/reception as in the CDMA scheme or the like is to use built-in antennas, a sufficient radiation efficiency can be obtained by selectively using two built-in antennas in accordance with the function of the cell phone, e.g., the speech communication function or the packet communication function.

That is, since the antenna switching circuit of the cell phone can maximize the antenna radiation efficiency in both speech communication and packet communication, the SIR (Signal to Interference power Ratio) on the base station side can be increased by using an optimal antenna. In addition, a reduction in speech communication current can be achieved by reducing the transmission power by TPC (Transmission Power Control).

Note that the number of antennas incorporated in the cell phone is not limited to two. For example, a cell phone having n (n is an integer equal to or more than 2) built-in antennas can also be designed such that the reception levels of the n built-in antennas are measured during a standby period to always automatically select an antenna with a high reception level, and an antenna having good antenna characteristics (radiation efficiency) is reliably selected in accordance with the function during speech communication.

In addition, if the above antenna switching circuit of the cell phone is formed into a hybrid IC, and the IC is applied to the cell phone, reductions in the size and weight of the cell phone can be attained.

As has been described above, the antenna switching circuit of the cell phone according to the present invention can obtain good reception characteristics by automatically switching the built-in antennas even if the antenna incorporated in the cell phone is brought close to the human body during speech communication.

In addition, even with regard to a cell phone designed to perform continuous transmission/reception as in the CDMA scheme or the like, after a selected antenna is determined, an optimal antenna can be selected during continuous transmission/reception in speech communication or packet communication.

What is claimed is:

1. An antenna switching method for a cell phone having built-in antennas including first and second antennas, comprising:

temporarily selecting one of the first and second antennas at the start of a standby state for waiting for one of an outgoing call and incoming call for speech communication and packet communication, and measuring reception levels of the first and second antennas;

switching the antennas when the reception level of one of the first and second antennas which has been temporarily selected is lower than the reception level of the other of the first and second antennas;

executing a cell search when a power switch of the cell phone is turned on;

selecting one of the first and second antennas which was selected when the power switch was turned off;

determining whether the execution of the cell search has succeeded; and switching the antenna to the temporarily selected antenna when the cell search has failed, and executing the cell search;

when the cell search has succeeded, shifting to a position registration sequence for a base station to perform position registration of the cell phone;

determining whether the position registration has succeeded;

when the position registration has failed, selecting an antenna which has not been selected for the cell search, and returning to the step of performing position registration; and when the position registration has succeeded, shifting to a standby state.

2. A method according to claim 1, further comprising:

always determining whether speech communication is being performed; and when no speech communication being performed, performing on-hook operation and shifting to the standby state.

3. A method according to claim 1, further comprising:

issuing an instruction to select the second antenna mounted near a microphone incorporated in the cell phone when speech communication is to be performed; and issuing an instruction to select the first antenna mounted near a speaker incorporated in the cell phone when packet communication is performed by key operation.

* * * * *